United States Patent [19]

Ohkura et al.

[11] Patent Number: 5,420,177

[45] Date of Patent: *May 30, 1995

[54] METHOD FOR PRODUCING COLORED AND EXACTLY SPHERICAL FINE-GRAINS OF POLYMER

[75] Inventors: Ken Ohkura, Tokyo; Yukio Shinagawa; Tamiaki Shibata, both of Shizuoka, all of Japan

[73] Assignee: Dainichi Seika Color & Chemicals Mfg. Co., Ltd., Tokyo, Japan

[ * ] Notice: The portion of the term of this patent subsequent to Oct. 22, 2008 has been disclaimed.

[21] Appl. No.: 92,946

[22] Filed: Jul. 19, 1993

Related U.S. Application Data

[63] Continuation of Ser. No. 611,262, Nov. 13, 1990, abandoned, which is a continuation-in-part of Ser. No. 465,725, Jan. 16, 1990, abandoned.

[30] Foreign Application Priority Data

Jan. 16, 1989 [JP] Japan ......................................... 1-6232

[51] Int. Cl.$^6$ .................................................. C08K 9/06
[52] U.S. Cl. ..................................... 523/213; 523/212; 524/431; 524/432; 524/434; 524/435; 524/436
[58] Field of Search ................. 523/212, 213; 524/431, 524/432, 434, 435, 436

[56] References Cited

U.S. PATENT DOCUMENTS

| | | | |
|---|---|---|---|
| 3,649,321 | 3/1972 | Durrant et al. | 106/300 |
| 3,649,588 | 3/1972 | Skigton | 523/212 |
| 4,077,804 | 3/1978 | Vanzo | 96/15 D |
| 4,148,741 | 4/1979 | Bayley | 523/212 |
| 4,348,309 | 9/1982 | Pruess | 523/336 |
| 4,447,475 | 5/1984 | Lubbock et al. | 427/213.31 |
| 5,059,639 | 10/1991 | Ohkura et al. | 523/205 |

FOREIGN PATENT DOCUMENTS 36010231  7/1936  Japan.
62-288632 12/1987  Japan.

*Primary Examiner*—Paul R. Michl
*Assistant Examiner*—John J. Guarriello
*Attorney, Agent, or Firm*—Banner, Birch, McKie & Beckett

[57] ABSTRACT

A method for producing colored and exactly spherical fine-grains of polymer by carrying out the suspension and polymerization of ethylenic unsaturated monomers containing a pigment in water under the presence of a suspension stabilizer, wherein an inorganic pigment treated with silane-coupling agent is used as said pigment. According to the present invention, the pigments are homogeneously dispersed in said exactly spherical fine-grains of polymer and a loss of color is prevented.

12 Claims, No Drawings

METHOD FOR PRODUCING COLORED AND EXACTLY SPHERICAL FINE-GRAINS OF POLYMER

This application is a continuation of U.S. application Ser. No. 07/611,262 filed Nov. 13, 1990, now abandoned; which is a continuation-in part of Ser. No. 07/465,725 filed Jan. 16, 1990, now abandoned.

BACKGROUND OF THE INVENTION

The present invention relates to a method for producing colored and exactly spherical fine-grains of polymer, in which pigment is homogeneously dispersed in the exactly spherical fine-grains of polymer and, thus, loss of color is prevented.

In the past, fine-grains of cross-linked resin, which are colored with water-soluble coloring matters, have become known (laid-open Patent Publication No. 288632/1987). Moreover, a method for producing colored grains of resin, which comprises the steps of mixing a dye or pigment with ethylenic unsaturated monomers, and suspension-polymerizing the obtained mixture in water medium under the presence of suspension stabilizers, is well known. (Patent Publication No. 10231/1961).

However, the fine-grains of cross-linked resin designated in said laid-open Patent Publication, which are colored with water soluble coloring matters, are inadequate for solvent resistance and weatherability, although the loss of color when the coloring matters are dropped out from the fine-grains of resin is limited. On the other hand, colored grains of resin which are obtained by merely blending pigments are comparatively good in solvent resistance and weatherability when mixed with paint. However, in the case of exactly spherical fine-grains of polymer using inorganic pigments, the loss of color is significant because the surfaces of the inorganic pigments show hydrophilic properties.

Therefore, when the untreated inorganic pigments are mixed with the ethylenic unsaturated monomers, and subsequently the suspension polymerization is carried out in water medium, the inorganic pigments are transferred into the water medium, and partially fixed on the surfaces of the exactly spherical fine-grains of polymer. The inorganic pigments fixed on the fine-grains of polymer are then dropped out from the polymer grains and, as a result, loss of color occurs and colored exactly spherical fine-grains of polymer containing smaller amounts of inorganic pigments therein are obtained.

The present inventors have made various studies to eliminate the aforementioned faults and consequently achieved this invention by finding that the colored and exactly spherical fine-grains of polymer, which do not exhibit a loss of color and are uniformly formed in the grain size of 5 μm to 100 μm, can be obtained by carrying out the suspension polymerization with the use of inorganic pigments which are surface-treated with a silane-coupling agent.

SUMMARY OF THE INVENTION

It is an object of the present invention to provide a method for producing colored and exactly spherical fine-grains of polymer wherein the disadvantages found in the prior art are overcome.

It is another object of the present invention to provide such a method wherein inorganic pigments are homogeneously dispersed in said exactly spherical fine-grains of polymer.

It is furthermore another object of the present invention to provide such a method wherein loss of color is prevented.

According to the present invention, the above objects are accomplished by providing a method for producing colored and exactly spherical fine-grains of polymer comprising, carrying out the suspension polymerization of ethylenic unsaturated monomers (monomers having at least two alpha-beta ethylenic unsaturated double bonds in one molecule) containing a pigment in water medium in the presence of a suspension stabilizer wherein said pigment is treated with a silane-coupling agent.

DETAILED DESCRIPTION OF THE INVENTION

The present invention is illustrated in detail as follows.

The ethylenic unsaturated monomers used in the present invention are monomers having at least two alpha-beta ethylenic unsaturated double bonds in one molecule. Such compounds may be, for example, acrylates or the corresponding methacrylates, such as ethylene glycol diacrylate, diethylene glycol diacrylate, triethylene glycol diacrylate, polyethylene glycol diacrylate, polypropylene glycol diacrylate, butylene glycol diacrylate, neopentyl glycol diacrylate, 1,4-butanediol diacrylate, 1,6-hexane-diol diacrylate, pentaerythritol triacrylate, and trimethylol propane triacrylate, bisphenol A diacrylate modified with ethylene oxide, a mixture of acrylates and methacrylates, aromatic divinyl compounds, such as divinyl benzene, etc.

In the present invention, the monomers having one alpha-beta, ethylenic unsaturated bond in one molecule can be used as required, which are copolymerized with said monomers, and they are designated as usual acrylic esters (ethyl, butyl, 2-ethyl, hexyl etc.), methacyrilic esters (methyl, ethyl, butyl etc.), unsaturated carbonic acids (acrylic acid, methacrylic acid, itaconic acid etc.), and furthermore described as 2-hydroxy ethyl ester of acrylic acid or methacrylic acid, glycidyl or methaglycidyl ester, amides of acrylic acid or methacrylic acid, their N-methylol or N-alkoxy methyl derivatives, monomers, such as acrylonitrile, methacrylonitrile, etc.

The suspension stabilizers used in the suspension polymerization are, for example, polyvinyl alcohol, hydroxyethyl cellulose, polyacrylic acid, polyacrylic amid etc.

Moreover, surfactants are used together with said suspension stabilizers and are, for example, nonionic surfactants, such as polyoxyethylene dodecyl ether, polyoxyethylene octyl phenyl ether, etc., anionic surfactants, such as alkyl sodium sulfate, alkylallyl sodium sulfate, fatty acid sodium salt and the like.

Radical polymerization initiators used in the suspension polymerization may be, for example, azobis-isobutyronitrile, azobis-valeronitrile, benzoylperoxide, t-butyl peroxide, redox type catalyzers and the like.

Furthermore, the inorganic pigments in the present invention, which are used by mixing with said ethylenic unsaturated monomer are subjected to the treatment with silane-coupling agents and are, for example, titanium dioxide, iron oxide, lead chromate, ultramarine blue, prussian blue, cadmium, compound oxide groups, zinc oxide, barium sulfate, calcium carbonate, etc.

Said silane-coupling agents for treating the pigments are exemplified as vinyl trichlorosilane, vinyl trimethoxysilane, vinyl triethoxysilane, vinyl tris(2-methoxy ethoxy)silane, vinyl triacetoxysilane, δ-chloropropyl trimethoxysilane, δ-aminopropyl triethoxysilane, δ-(2-aminoethyl) aminopropyl triethoxysilane, δ-mercaptopropyl trimethoxysilane, δ-glycidoxypropyl trimethoxysilane, β-(3,4-epoxycyclohexyl)ethyl trimethoxysilane, δ-methacryloxypropyl trimethoxysilane, 3-glycidoxypropyl methyl dimethoxysilane, etc.

The treatment of the pigments with the silane-coupling agent is carried out by the steps of adding the pigments to methanol etc., stirring and mixing the same to make a slurry, adding silane-coupling agent thereto, subsequently removing the methanol by distillation, and heating the residual pigments at a temperature of 95°–110° C. for about 3–10 minutes.

The amount of the silane-coupling agent to be added into the pigments is 0.3–12.0 parts by weight to 100 parts by weight of the pigments. Preferably, the amount is about 1.0–7.0 parts by weight of silane-coupling agent.

An amount less than 0.3 parts by weight is not desirable because the pigments move to the water medium during the polymerization. Moreover, an amount more than 12.0 parts by weight is also not desirable because the advantages of the instant invention cannot be expected with excess amounts and the cost becomes higher because the silane-coupling agent is expensive.

The production of the colored and exactly spherical fine-grains of polymer by using said pigment treated with silane-coupling agent is carried out by the steps of adding, first of all the pigments into the ethylenic unsaturated monomers, homogeneously mixing the same by roll mill or sand mill, and adding radical polymerization initiator into the mixture.

Furthermore, the suspension stabilizers, such as polyvinyl alcohol etc., are dissolved in water, the mixture of said ethylenic unsaturated monomers, pigments and radical polymerization initiator is added to said aqueous solution, and the mixture obtained is stirred at a high speed controlling the size of the suspended particles.

Then, the content of the suspension is transferred into a vessel having a usual wing stirrer, and is polymerized by heating at a temperature of 60° C.–70° C. The polymerized suspension slurry is filtered, washed, dried and ground to obtain the colored and exactly spherical fine-grains of polymer.

EXAMPLES

The present invention is concretely illustrated by the following examples.

Example 1 (titanium oxide)

Preparation of titanium oxide pigment treated with silane-coupling agent 100 parts by weight of titanium oxide (trade name:-JR-701 titanium produced by Teikoku Kako Co.) and 200 parts by weight of methanol are put into a vessel having a stirrer, and stirred and mixed to make a homogeneous slurry. 3 parts by weight of δ-methacryl oxypropyltrimethoxysilane is subsequently added to said slurry, stirred and mixed at a temperature of 28° C. for 20 minutes, after which the methanol is removed by distillation and the residual titanium oxide is heated at a temperature of 100° C. for 5 minutes to obtain titanium oxide pigment treated with silane-coupling agent.

Preparation of colored and exacted spherical fine-grains of polymer 24 parts by weight of said titanium oxide treated with silane-coupling agent is added into 40 parts by weight of bisphenol A diacrylate modified with ethylene oxide, and homogeneously mixed by roll mill. With said mixture, a mixture obtained by dissolving 0.8 parts by weight of azobisisobutylonitrile in 40 parts by weight of 1,6 hexamethylene diacrylate, is mixed with stirring.

The obtained mixture is, then, added to the aqueous solution prepared by dissolving 10 parts by weight of polyvinylalcohol in 200 parts by weight of water, and stirred with a high speed stirrer to control the size of suspended particles. The content of the suspension is transferred into a vessel having a usual wing stirrer, and polymerized by elevating the temperature to 65° C.–70° C.

The polymerized suspension slurry is filtered, washed and dried with hot air, to obtain white colored and exacted spherical fine-grains of polymer.

The obtained particles are fine-grains having an average particle size of 30 μm. The particles of titanium oxide are homogeneously dispersed into the fine-grains of polymer according to the observation of an optical microscope, and a loss of color of the pigments is not observed.

Comparative Example 1 (titanium oxide)

The colored and exactly spherical fine-grains of polymer are prepared by the same process as shown in Example 1, using titanium oxide which is not treated with silane-coupling agent. Much of the pigment moved into the water phase when the suspension is produced.

According to the observation of the obtained fine-grains of polymer by the optical microscope, the particles of pigment are mostly fixed on the surfaces of the fine-grains of polymer, and loss of color of the pigment is significant.

Example 2 (red iron oxide)

Preparation of red iron oxide pigment treated with silane-coupling agent 100 parts by weight of red iron oxide (trade name:-Toda 130 ED red oxide N Toda Industrial Co.) are put into a mixer, and a mixture of 3 parts by weight of δ-glycidoxy propyltrimethoxysilane and 3 parts by weight of methanol, is added thereto with stirring and then stirred and mixed at the normal temperature for seven minutes to obtain red iron oxide pigments treated with silane-coupling agent.

Preparation of colored and exactly spherical fine-grains of polymer 12 parts by weight of said red iron oxide pigment treated with silane-coupling agent is added to 56 parts by weight of bisphenol A diacrylate modified with ethylene oxide, and homogeneously mixed by sand mill. To said mixture, a mixture which is obtained by dissolving 0.8 parts by weight of azobisisobutyronitrile into 24 parts by weight of 1,6 hexamethylene diacrylate, is added with stirring.

The obtained mixture is, then, added into the solution prepared by dissolving 10 parts by weight of polyvinyl alcohol in 200 parts by weight of water, and stirred with a high speed stirrer to control the size of suspended particles. The content of the suspension is transferred into a vessel having a usual wing stirrer, and polymerized by elevating the temperature to 65° C.–70° C.

The polymerized suspension slurry is filtered, washed and dried with hot air, to obtain red colored and exactly spherical fine-grains of polymer.

The particles obtained are fine-grains having an average particle size of 25 μm. The particles of red iron oxide are homogeneously dispersed into the fine-grains of polymer according to the observation of an optical microscope, and a loss of color of pigment is not observed.

Example 3 (yellow iron oxide)

Preparation of yellow iron oxide pigment treated with silane-coupling agent 100 parts by weight of yellow iron oxide (Trade name: Mapicoyellow LLXLO, Titan Industrial Co.) are put into a mixer (Trade name: Henshel Mixer Mitsuimiike Manufacturing Co.), and a mixture of 3 parts by weight of δ-glycidoxy propyltrimethoxysilane and 3 parts by weight of methanol is added thereto with stirring, and then stirred and mixed at the normal temperature for twenty minutes to obtain yellow iron oxide pigments treated with silane-coupling agent.

Preparation of colored and exactly spherical fine-grains of polymer 12 parts by weight of said yellow iron oxide pigment treated with silane-coupling agent is added to 40 parts by weight of bisphenol A diacrylate modified with ethylene oxide, and homogeneously mixed by roll mill. To said mixture, a mixture, which is obtained by dissolving 0.8 parts by weight of azobisisobutylonitrile to 40 parts by weight of 1,6 hexamethylene diacrylate, is mixed with stirring.

The obtained mixture is, then, added to the solution prepared by dissolving 10 parts by weight of polyvinyl alcohol to 200 parts by weight of water, and stirred with a high speed stirrer to control the size of suspended particles of the suspension. The content of the suspension is transferred into a vessel having a usual wing stirrer and polymerized by elevating the temperature to 65° C.–70° C.

The polymerized suspension slurry is filtered, washed and dried with hot air, and after that, ground to obtain yellow colored and exactly spherical fine-grains of polymer.

The particles obtained are fine-grains having an average particle size of 35 μm. The particles of yellow iron oxide are homogeneously dispersed into the fine-grains of polymer according to the observation of an optical microscope, and a loss of color was not observed.

Comparative Examples 2 and 3 (red iron oxide and yellow iron oxide)

The colored and exactly spherical fine-grains of polymer are prepared by the same process as shown in Examples 2 and 3, except using red iron oxide and yellow iron oxide which are not treated with silane-coupling agent, respectively.

But the particles of pigment are mostly moved into the water phase, the same as in comparative example 1, when the suspension is produced.

And according to the observation of the obtained fine-grains of polymer by the optical microscope, the particles of pigment are mostly fixed on the surfaces of the fine-grains of polymer, and the loss of color of the pigment is significant.

The effects of the present invention are as follows.

With the colored and exactly spherical fine-grains of polymer of the present invention, the pigments are homogeneously dispersed into the fine-grains of polymer. Moreover, said colored and exactly spherical fine-grains of polymer are excellent in solvent resistance property, and thus, the pigments are not dropped out from the fine-grains of polymer, and loss of color does not occur, even though they are blended into organic solvent or paint vehicle.

Furthermore, the colored and exactly spherical fine-grains of polymer of the present invention are resin beads excellent in weatherability and heat-resistant properties. They have a soft feeling and are available for various kinds of paints, not only for air dry-setting paint, but also for heat-setting paint.

What is claimed is:

1. A method for producing colored and spherical fine-grains of polymer comprising:
    adding an inorganic pigment selected from the group consisting of titanium dioxide, iron oxide, lead chromate, ultramarine blue, prussian blue, cadmium, compound oxide groups, zinc oxide, barium sulfate, and calcium carbonate, to methanol, stirring and mixing the same to make a slurry and then further adding a silane coupling agent with subsequent removal of the methanol to form a treated inorganic pigment;
    performing a suspension polymerization of monomers having at least two alpha-beta ethylenic unsaturated double bonds in one molecule with the treated inorganic pigment in water medium in the presence of a suspension stabilizer.

2. The method according to claim 1, wherein said monomer is bisphenol A diacrylate modified with ethylene oxide.

3. The method according to claim 1, wherein said monomer is selected from the group consisting of acrylates, the corresponding methacrylates, a mixture of acrylates and methacrylates, and aromatic divinyl compounds.

4. The method according to claim 1, wherein said pigment is titanium oxide.

5. The method according to claim 1, wherein said pigment is iron oxide.

6. The method according to claim 1, wherein said pigment is selected from the group consisting of lead chromate, ultramarine blue, prussian blue, cadmium, multiple oxide groups, zinc oxide, barium sulfate and calcium carbonate.

7. The method according to claim 1, wherein said silane-coupling agent is δ-methacryl oxypropyltrimethoxysilane.

8. The method according to claim 1, wherein said silane-coupling agent is δ-glycidoxy propyltrimethoxysilane.

9. The method according to claim 1, wherein said silane-coupling agent is selected from the group consisting of vinyl trichlorosilane, vinyl trimethoxysilane, vinyl triethoxysilane, vinyl tris(2-methoxyethoxy)silane, vinyl triacetoxysilane, δ-chloropropyl trimethoxysilane, δ-aminopropyl triethoxysilane, δ-(2-aminoethyl) aminopropyl triethoxysilane, δ-mercaptopropyl trimethoxysilane, β-(3,4-epoxycyclohexyl)ethyl trimethoxysilane, 3-glycidoxypropyl methyl dimethoxysilane.

10. The method according to claim 1, wherein the amount of the silane-coupling agent to be added into the pigments is 0.3–12.0 parts by weight to 100 parts by weight of the pigments.

11. A method according to claim 1, wherein the methanol is removed by distillation.

12. A method according to claim 1, wherein the inorganic pigments are heated to a temperature of 95°–110° C. for 3 to 10 minutes subsequent to the removal of the methanol.

* * * * *